United States Patent [19]

Wright

[11] Patent Number: 4,860,155
[45] Date of Patent: Aug. 22, 1989

[54] OVERVOLTAGE PROTECTION DEVICE

[75] Inventor: Martin A. Wright, Swindon, England

[73] Assignee: Raychem Limited, Swindon, England

[21] Appl. No.: 945,640

[22] Filed: Dec. 23, 1986

Related U.S. Application Data

[63] Continuation-in-part of Ser. No. 845,660, Mar. 28, 1986.

[51] Int. Cl.$^4$ .............................................. H02H 1/04
[52] U.S. Cl. ...................................... 361/111; 361/56; 361/91; 361/119
[58] Field of Search .................... 361/56, 86, 91, 111, 361/117, 118, 119

[56] References Cited

U.S. PATENT DOCUMENTS

| | | | |
|---|---|---|---|
| 3,271,591 | 9/1966 | Oushinsky | 307/252 E |
| 3,343,034 | 9/1967 | Oushinsky | 361/111 X |
| 3,436,601 | 4/1969 | Dyre | 361/119 |
| 3,558,830 | 1/1971 | Bender | 361/119 |
| 4,095,163 | 6/1978 | Montague | 361/111 X |
| 4,156,838 | 5/1979 | Montague | 361/118 X |
| 4,575,691 | 3/1986 | Capak et al. | 361/119 X |
| 4,616,288 | 10/1986 | Scholtholt et al. | 361/119 |

FOREIGN PATENT DOCUMENTS

| | | |
|---|---|---|
| 0019884 | 5/1980 | European Pat. Off. . |
| 0050966 | 5/1982 | European Pat. Off. . |
| 0072146 | 2/1983 | European Pat. Off. . |
| 198624 | 10/1986 | European Pat. Off. . |
| 1437387 | 11/1968 | Fed. Rep. of Germany . |
| 800252 | 8/1958 | United Kingdom . |
| 960667 | 6/1964 | United Kingdom . |
| 1038050 | 8/1966 | United Kingdom . |
| 1060172 | 3/1967 | United Kingdom . |
| 1412158 | 10/1975 | United Kingdom . |
| 2040120 | 8/1980 | United Kingdom . |
| 2094078 | 9/1982 | United Kingdom . |

OTHER PUBLICATIONS

Pinto et al., "Electric Field Induced Memory Switching in Thin Films of the Chalcogenide Sytem Ge-As-e", Applied Physics Leters, vol. 19, No. 7, 10/1/71.

Primary Examiner—A. D. Pellinen
Assistant Examiner—Derck S. Jennings
Attorney, Agent, or Firm—Herbert G. Burkard; B. John Lyons

[57] ABSTRACT

A circuit protection device comprising a chalcogenide glass threshold switching element connected or arranged to be connected between a current carrying line and earth, and a capacitor connected in a series with the switching element.

18 Claims, 3 Drawing Sheets

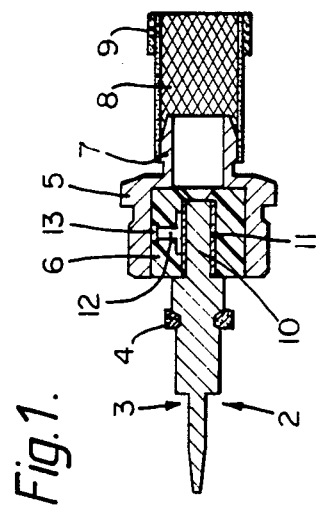
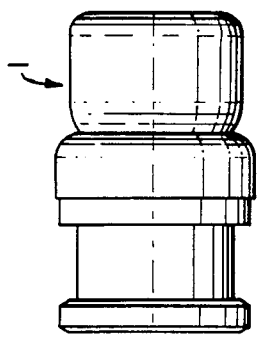
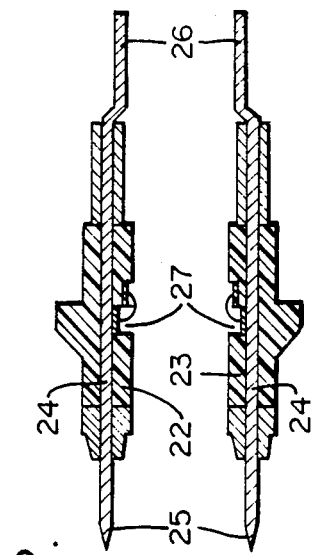
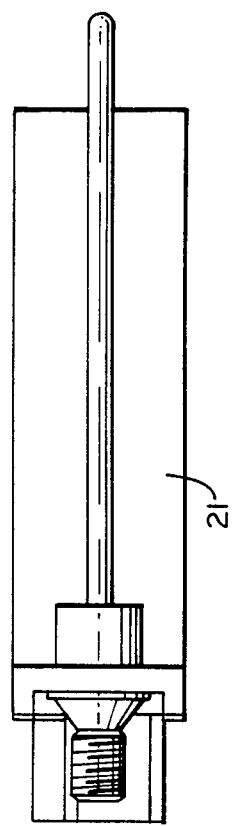
Fig.1.
Fig.2.

OVERVOLTAGE PROTECTION DEVICE

This application is a continuation-in-part of application No. 84,660 filed Mar. 28th, 1986, the entire disclosure of which is incorporated herein by reference.

This invention relates to circuit protection devices and especially to devices for protecting electrical circuits from voltage transients that are caused by an electromagnetic pulse, e.g. lightning, and also the transients that are caused by electrostatic discharge.

Electrostatic discharge and electromagnetic pulses can all induce very high currents and voltages on cables and structures such as aeroplanes and ships, which can penetrate the electrical systems and damage them, either causing hardware damage such as semiconductor burnout, or electronic upset, e.g. transmission loss or loss of stored data. As semiconductor technology advances, the energy needed to cause such damage becomes less.

Electrostatic discharges are extremely fast discharges from a capacitor such as a human body. These discharges, because they can be so local, present an extreme threat to the individual electronic component. The magnitude of the threat is illustrated by reference to IEC Technical Committee TC65, WG4 draft specification or the SAE-AE-4 proposed specification on ESD. In these documents the maximum threat is a double exponential pulse of rise time 5 nanoseconds with a 30 nanosecond fall time. The peak voltage is given as 15,000 volts with a current of 70 amps. The energy storage capacitance is given as 150 pico farads giving a maximum energy of 33 millijoules.

Induced electrical transients caused by lightning represent a threat to electrical/electronic equipment especially in aerospace vehicles. The characteristics of the induced pulses are best described in the SAE AE4L Committee Report AE4L-81-22. Test Wave Forms and Techniques for Assessing the Effects of Lightning-Induced Transients. This specification describes the idealised versions of the lightning stroke waveform and of those which occur when equipment cables are excited by the EM environment produced. The specification specified a range of transients which may be produced during normal operation. The waveforms expected on each line depend on a number of factors but the two basic types are (waveform 3) with a frequency of between 1 and 10 MHz, a rise time of 45 nanoseconds and a peak current of 24 amps. The alternative wave form (Wave Form 4A) is a decaying exponential with a rise time of 100 nanoseconds and a width of 2 microseconds with a peak voltage of 300 volts and peak current of 60 amps.

The most severe threat to electrical and electronic equipment is the electromagnetic pulse although all effects can generate large voltage or current spikes with very short rise times. The exact characteristics of the pulse are complicated although a typical pulse will exhibit a field strength of about $10^5$ Vm$^{-1}$ with an accompanying H field intensity of 130 Am$^{-1}$ (based on free space impedance of 377 ohms), a pulse width of a few microseconds and a rise time of a few nanoseconds. In general damaging amplitudes in the pulse occur within the frequency range of 10 KHz to 100 MHz.

It has been proposed to use certain materials, for example certain chalcogenide glasses, in the formation of devices for protecting electrical circuits, for example as described in U.S. Pat. Nos. 3,271,591 and 3,343,034 to Ovshinsky and, U.S. Pat. No. 3,436,601 to Dyre, the disclosures of which are incorporated herein by reference. Some of these chalcogenide glasses may be used to form "threshold" devices by which is meant devices that will change from a high resistance state to a low resistance state on application of a high voltage, called the the threshold voltage, but which will remain in their low resistance state only for as long as a small "holding" current is maintained. Other glasses can be used to form "memory" devices which will change from a high resistance state to a low resistance state on application of a high voltage and which will then remain in their low resistance state, even when no voltage is applied, until an appropriate, different, voltage pulse is applied. Only threshold devices are considered here in the manufacture of circuit protection devices since it is desirable for the device to return to its normal operating state as soon as any transient has passed.

Chalcogenide glass materials have been considered for use as circuit protection devices in view of a number of desirable properties, for example they can switch from their high resistance state to their low resistance state in a very short time, e.g. in less than 1 nanosecond, and the electrical resistance of their high and low resistance states can differ by two, three or even by four or more orders of magnitude. However, these materials, and other switching materials, can suffer from a number of disadvantages. For example, we have found that even though a switching device may be formed from a threshold material, it may easily become permanently electrically conducting, with the result that the protection device must be replaced or reset before the circuit can be used.

The present invention provides a device for protecting an electrical circuit from an electrical surge, which comprises a semiconductor threshold switching element that is connected, or arranged to to be connected, between a current carrying line of the circuit and earth, and a capacitor connected in series with the threshold switching element.

The threshold switching element is chosen to have a threshold switching voltage that is higher than the normal operating voltage of the line so that it will remain in its high resistance state during normal operation but will switch to its low resistance state when the circuit is subjected to a voltage transient.

We have observed that the problems of the previous proposals are due, at least in part, to the fact that after the transient has passed, the normal direct currents that may occur in the circuit can hold the switching element in its low resistance state indefinitely, and that very low frequency alternating current power lines in the circuit may hold the element in its low resistance state for sufficient time for the material to "latch" i.e. to adopt memory characteristics and thereby cause the device to remain permanently in its low resistance state.

According to the present invention, these problems are overcome by the provision of a capacitor in series with the switching device. The capacitor may be provided between the switching device and the current carrying line or between the switching device and earth (the term "earth" in this context including any structure having an appropriate shape and/or capacity so that it can absorb charge generated by the transient, and includes for example connection to chassis of equipment and the like in vehicles such as aircraft). The required capacitance of the capacitor will depend on a number of factors including the material from which the switching element is formed, the nature of the transient against which the protection is desired, and the intended use of the circuit. For example, in order to protect an electrical circuit against electrostatic discharge, a capacitance of at least 1 nanofarad is preferred, and especially at least 10 nanofarads. For protection against other threats, for example as described by H. R. Philipp and L. M. Levinson in J. Appl Phys. 52(2) February, 1981 pp. 1083 to 1090, the disclosure of which is incorporated herein by reference, the capacitance may need to be larger, e.g. at least 30 and preferably at least 100 nanofarads. A capacitor of this size will allow all transients having a frequency spectrum above about 1 MHz to pass to earth and so allow the device to protect the circuit from the transient. Preferably the capacitor has a capacitance of not more than 2, more preferably not more than 1 and especially not more than 0.5 microfarads. The use of a capacitor of less than 2 microfarads and particularly one of less than 1 microfarad has the advantage that the switching device is itself protected by the capacitor against damage by low frequency components of the transient. On the basis of observations made, it appears that certain forms of threshold switching elements may require less electrical energy to latch them in their low resistance state at low electrical frequencies (e.g. less than 100 KHz) than at higher frequencies. Thus, many devices that exhibit acceptable energies to latch at frequencies of about 10 MHz would, in fact, latch in their low resistance state when subjected to a voltage transient due to the low frequency components of the transient if no such capacitor were provided. Any such low frequency components of the transient that are not passed to earth by the switch can easily be filtered out of the electrical circuit by conventional means with no loss to the signal carried by the circuit.

The devices may be incorporated in an electrical circuit in any suitable position, normally being connected between a current carrying line and earth, and, of course, more than one such device may be employed in the electrical circuit. The devices are conveniently incorporated in other electrical components for example electrical connectors, in which case the device will usually be connected between a current carrying element of the device and a terminal or other par of the device to be earthed e.g. a conductive housing or an earth line. The device should be arranged so that the entire pulse passes through the switch and the capacitor, i.e. by arranging the device so that no current carrying paths are connected in parallel with the capacitor or switch.

In many devices according to the invention, each switching element will be connected to a separate capacitor, and in such devices it may be convenient to form the capacitor and the switching element as a single unit. For example, if the capacitor has a terminal that is substantially flat, the material from which the switching element is formed may be deposited on the terminal either directly or after the terminal has been suitably prepared e.g. by the provision of a deposited layer of electrode material for the switching element for instance molybdenum. After the switching material has been deposited a second electrode layer is deposited, optionally followed by one or more further layers e.g. to improve solder adhesion.

In other devices, however, a single capacitor may be connected to a number of switching elements. For example a connector may be provided with a switching element for each current carrying line and all the switching elements may be connected to earth via a common capacitor. Since the capacitor will usually have significantly larger dimensions than any of the switching elements, such an arrangement offers a substantial reduction in size. It was considered that if two lines in such a device carried direct currents and were at different potentials, then if both the lines simultaneously experienced the transient, as might well be the case, thereby switching both their respective switching elements to a low resistance state, the switching elements may be latched in their low resistance state by a direct current flow from one line to the other, since there would be no capacitor in series between the current carrying lines. However, we have observed that, in general, no such latching occurs. It is believed that the absence of latching is due in part to the fact that, for signal lines the system impedance is so high that the current flow between the lines is usually too small to retain the switching elements in their low resistance state, and in part because in order for the elements to latch due to current flow between the lines, the current flow through one of the switching elements must be reversed as the transient subsides, and that switching element will revert to its high resistance state as the instantaneous current reaches zero during the current reversal.

Although in most instances the device will revert to its high resistance state as soon as the transient voltage has subsided, it is possible for the device to be forced into a permanent low resistance state, for example if the voltage transient is unduly large or if a number of rapid transients are experienced. Whether or not the device will become permanently conductive depends on the amount of energy absorbed by the device from the transient. In some applications, for example in some ground installations, it may be desirable for the protection device to fail in this way, that is to say, so that the equipment is still protected against transients but will not function until the protection device is replaced. In other applications it may be desirable for the device to fail in a high resistance (open circuit) state so that the equipment will carry on functioning although unprotected from subsequent transients. Thus the device may includes means, connected in series with the switching element, that will exhibit a high resistance if the switching element becomes permanently electrically conducting. Preferably such means will exhibit such a high resistance if the switching element becomes permanently conductive that the circuit between the current carrying line and earth is effectively broken, such means including a fuse or switch. In the case of d.c. circuits or circuits carrying very low frequency alternating currents, the device may be connected between the capacitor and earth although it is preferred, especially for d.c. circuits, for the device to be connected between the current carrying line and the capacitor so that the capacitor is isolated from the line in the event that the switching element fails.

Preferably the material forming the switching element has a turn-on time of not more than 1 nanosecond, and a turn-off time of not more than 10 microseconds especially not more than 1 microsecond. Also, as explained in copending patent application Ser. No. 014,118 filed Jan. 30, 1987 continuation application of patent application No. 845,652 filed on Mar. 28th, 1986 now abandoned, the disclosure of which is incorporated herein by reference, it is preferred for the material to have a critical switching a field strength in the range of from $10^4$ to $10^5$ Vcm$^{-1}$ and a resistivity in its high resistance state of at least $10^7$ ohm cm. Furthermore, preferred switching element materials will have a latching energy of at least 2000, preferably at least 4000 and especially at least 10,000 Jm$^{-1}$ (joules per meter of the element thickness) and exhibit a figure of merit of at least 10 and especially at least 20 kgm$^3$s$^{-2}$A$^{-1}$, where the figure of merit is defined as:

$$\text{figure of merit} = \frac{E_L \cdot \rho\text{off}}{V_{th} \cdot \epsilon r}$$

in which $E_L$ is the energy required to latch the material in its low resistance state (measured in joules per metre of thickness);

$\rho$off is the resistivity of the material in its high resistance state (measured in ohm meters);

$V_{th}$ is the threshold field strength of the material (measured in volts per metre); and $\epsilon r$ is the dielectric constant of the material.

The switching element is preferably formed from a chalcogenide glass, by which is meant a glass formed from one or more elements of group VIB of the periodic table (IUPAC 1965 revision) together with one or more elements of group IVB and/or VB and optionally IIIB for example as described in U.S. Pat. No. 3,271,591 to Ovshinsky. Preferred chalcogenide glasses, which can be used to form elements having the preferred properties mentioned above are described in our copending application entitled "Circuit Protection Device" mentioned above. These glasses comprise germanium, selenium and arsenic optionally together with minor amounts of other materials. Preferably the glasses comprise:

(a) 5 to 42 atomic % germanium;
(b) 15 to 75 atomic % selenium; and
(c) 10 to 65 atomic % arsenic;

in which the proportions of (a), (b) and (c) (based on the total molar quantity of (a), (b) and (c) but excluding any optional additional materials) add up to 100%.

Preferably the composition contains not more than 35 atomic % germanium, more preferably not more than 30 atomic % germanium, and especially not more than 25 atomic % germanium. Also, the composition preferably contains at least 20 atomic % selenium and especially at least 30 atomic % selenium but preferably not more than 70 atomic % selenium and especially not more than 60 atomic % selenium. The composition preferably contains at least 20 atomic % arsenic and especially at least 25 atomic % arsenic, but especially not more than 55 atomic % arsenic. Thus the composition preferably comprises:

(a) 5 to 30 atomic % germanium;
(b) 20 to 70 atomic % selenium; and
(c) 20 to 60 atomic % arsenic, and most preferably comprises:

(a) 5 to 25 atomic % germanium;
(b) 30 to 60 atomic % selenium; and
(c) 25 to 55 atomic % arsenic.

All the proportions of the components (a), (b) and (c) are based on the total molar quantity of (a), (b) and (c) alone and total 100%.

Several embodiments of the invention will now be described by way of example, with reference to the accompanying drawings, in which:

FIG. 1 is a side view, partly in section, of a BNC coaxial connector that incorporates a circuit protection device according to the invention;

FIG. 2 is a side view, partly in section, of a flat cable mass termination connector and wafers that incorporate a circuit protection device according to the invention;

Figure 3:
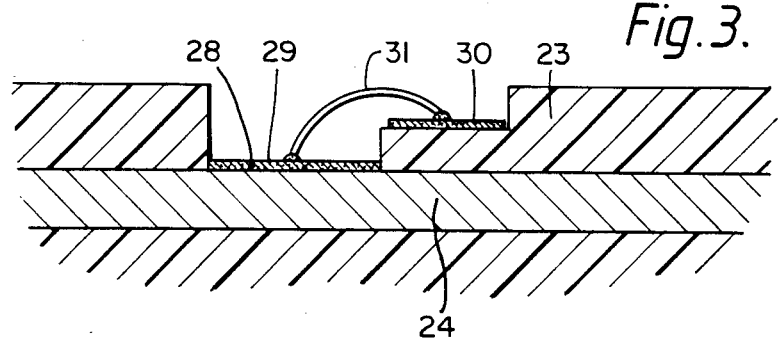
FIG. 3 is an enlarged view of part of the connector shown in FIG. 2.

Referring to FIG. 1 of the accompanying drawings, a connection arrangement for connecting two coaxial cables comprises a connector shell 1 and a male connector 2. The male connector 2 comprises a pin 3, the central and rear portion of which is hollow for receiving the central conductor of a coaxial cable to be connected (not shown). The pin has a fluxed solder ring 4 and a number of apertures (not shown) beneath the solder ring which communicate between the solder ring 4 and the hollow interior of the pin 3. The rear end 10 of the pin is firmly located in a connector housing 5 by means of an electrically insulating plastics spacer 6. The housing 5, which provides the electrical connection between the shields of the cables to be connected, has a termination portion 7 on which is mounted a solder impregnated braid 8 and solder ring 9.

The rear end 10 of the pin is provided on its outer surface with a 10 micrometer thick layer 11 of a selenium-germanium-arsenic glass described above that has been deposited thereon by a vapour deposition method, and the outer surface of the glass layer 11 has been provided with a thin (about 5 micrometers thick) electrode e.g. molybdenum by a d.c. sputtering method. The electrode is electrically connected to the housing 5 via a 100 nanofarad capacitor 13 by means of a column or wire 12 of solder or other suitable conductive material.

In order to connect a coaxial cable to the connector, the outer jacket, shield and dielectric are cut back by appropriate amounts and the cable inserted into the connector so that the exposed end of the internal conductor is located within the hollow interior of the pin 3, the dielectric abuts the rear end of the spacer 6 and the exposed shield is located within the solder impregnated braid 8. The connector is then briefly heated, for example by means of a hot-air gun, to fuse the solder rings 4 and 9 and to form solder connections between the pin 3 and central conductor and between the braid 8 and coax cable shield.

The connector will function exactly as a standard coaxial connector until the connected cable experiences a voltage transient whereupon the potential difference across the thickness of the glass layer 11 will cause the glass to become electrically conductive and form a closed circuit between the central conductor and the screen.

Figure 4:
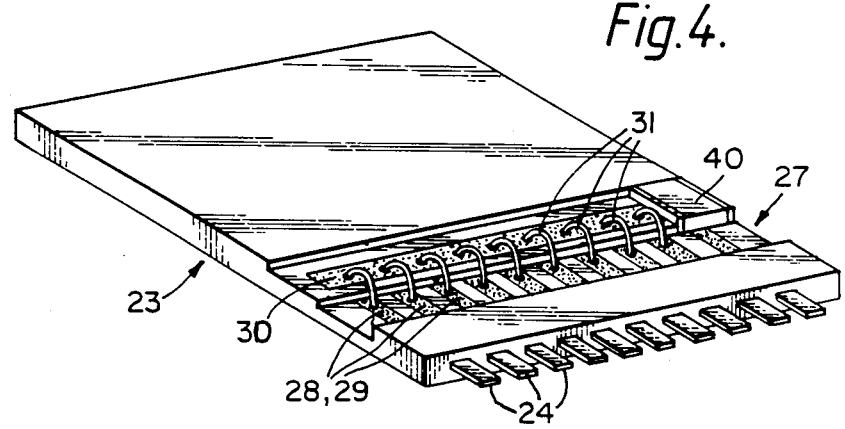
FIG. 4 is a perspective view of one of the wafers shown in FIG. 2.

Referring to FIGS. 2 to 4, a mass termination connector such as that described in British patent No. 1,522,485 (the disclosure of which is incorporated herein by reference) is schematically shown.

The connector comprises a connector housing 21 and a pair of connector wafers 22 and 23 that can be inserted into the housing. Each wafer 22,23 has a number of (usually 20 or 40) metallic electrical conductors 24 extending therethrough which terminate at one end either in the form of pins 25 or complementary "tuning fork" female contacts and at the other end in the form of contacts 26 for connection to a flat cable or to a number of small single conductor wires. The particular means used for connecting the conductors 24 to the wires or flat cable is not shown but usually comprises one or more solder devices as described in U.S. Pat. No. 3,852,517.

In each of the wafers 22 and 23 a stepped recess 27 is made that extends across the width of the entire wafer to expose each of the conductors. In one embodiment of this connector, a 10 micrometer thick layer 28 of the selenium-germanium-arsenic glass described above is deposited onto the individual conductors 24 and a thin electrode 29 formed e.g. from molybdenum, optionally together with gold or aluminium is deposited on top of the glass layer 28. An additional conductive layer 30 or "ground plane" of gold or aluminium is deposited on the wafer material in the stepped recess 27, the ground plane being electrically earthed for example to the metallic housing of the connector or to an earth pin. Each electrode 29 is connected to the ground plane by means of a wire 31 formed from e.g. gold or aluminium and bonded to the electrode 29 and ground plane 30 by conventional wire bonding techniques.

Alternatively, a single layer 28 of the glass and electrode 29 may be deposited across the entire width of the wafer in which case only a single wire 31 is necessary for connection to the ground plane.

In an alternative construction, the selenium-germanium-arsenic glass layer and electrodes are deposited onto the common ground plane 30, and the wires 31 connect the conductors 24, after any appropriate surface preparation if necessary, with the electrode of the glass layer.

As shown in FIG. 4, a 100 nanofarad capacitor 40 is located in the recess 27 and is connected between the ground plane and an earth terminal or housing of the connector. In operation, any transient having a frequency spectrum above about 1 MHz is conducted directly to earth while any direct currents or alternating currents of frequencies significantly lower than about 1 MHz are blocked by the capacitor.

Figure 5:
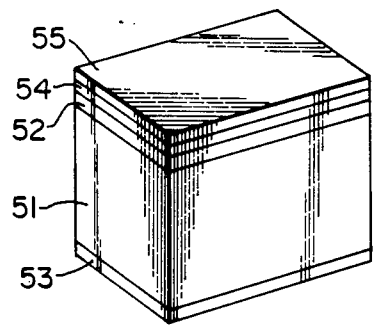
FIG. 5 is a schematic view of an individual circuit protection device according to the invention.

FIG. 5 shows schematically a circuit protection device according to the invention that may be incorporated into any larger electrical component. The device comprises a capacitor 51 having a capacitance for example of 0.5 to 3 microfarads (although larger or smaller capacitances e.g. 0.1 to 1 microfarads may be desired in many circumstances) which is provided with terminals 52 and 53. A 10 micrometer thick layer 54 of the selenium-germanium-arsenic glass switching material described above is deposited on the terminal 52 for example by a vapour deposition method and then a thin electrode 55 for example formed from molybdenum is deposited on the glass layer 54 e.g. by a d.c. sputtering technique. Additional metal layers may be provided on top of the electrode 55 in order to improve the formation of solder joints if desired. As described above, the glass layer will become conductive when the circuit is exposed to a transient having a high frequency spectrum, e.g. above 1 MHz, to allow the transient to be passed to earth, but the capacitor will exhibit a high impedance to lower frequency signals and therefore prevent such signals latching the glass layer 54 in its low resistance state.

Figure 6:
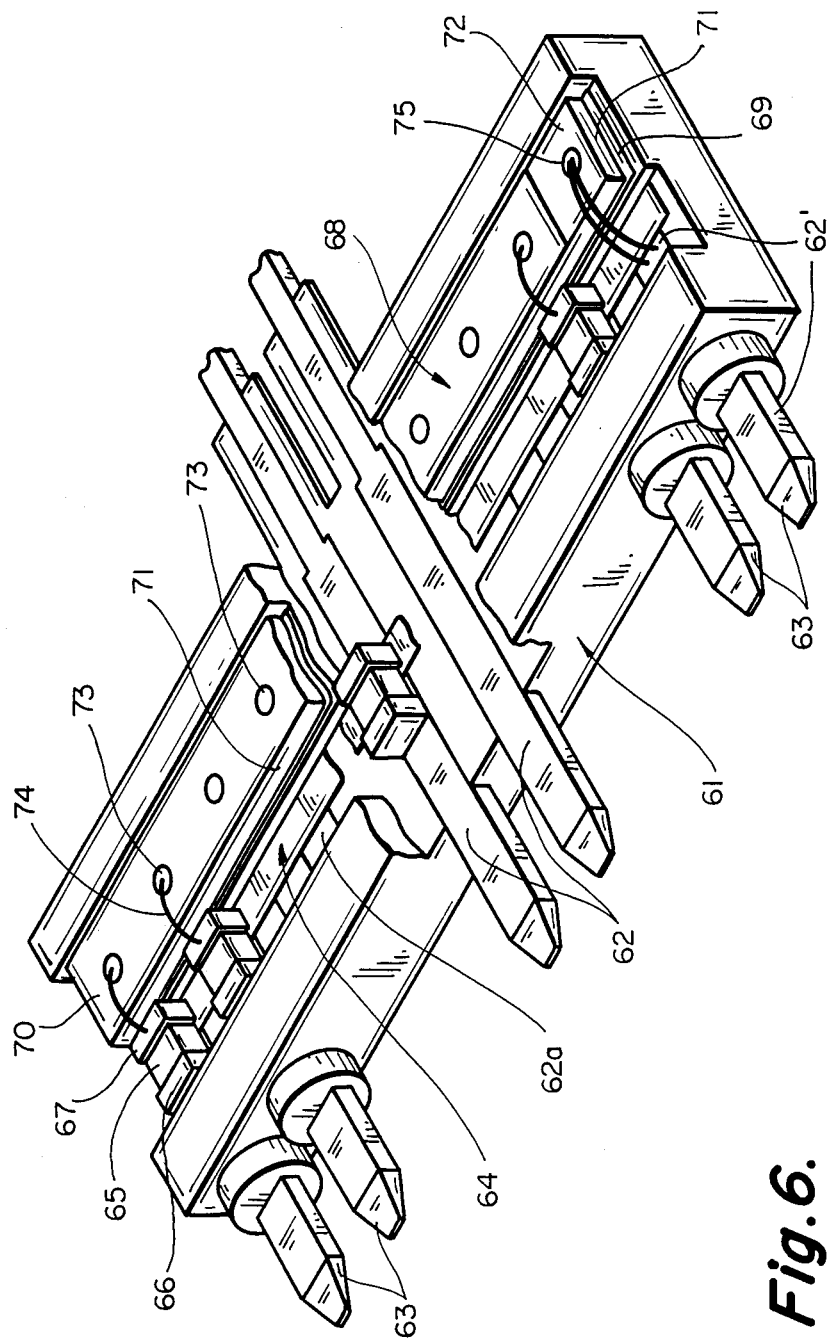
FIG. 6 is a partially cut-away isometric view of another connector that employs a circuit protection device in accordance with the invention.

Referring to FIG. 6, a wafer 61 for insertion into a mass termination connector housing such as described in British patent specification No. 1,522,485 mentioned above has ten metallic conductors 62 extending through it. At one end the conductors 62 are in the form of pins 63 for mating with "tuning fork" contacts of a complementary connector, and at the other end the conductors are arranged for connection to a flat cable or to a number of small primary wires. The end conductor 62' is connected to ground. The particular means used for connecting the conductors 62 to the wires or flat cable is not shown but usually comprises one or more solder devices as described in U.S. Pat. No. 3,852,517.

A stepped recess is formed on one side of the wafer 61 which extends transversely across the entire width of the wafer, the deepest part of the recess exposing a portion 62a of each of the conductors 62. A strip of insulating, preferably adhesive, film 64 is laid along part of the recess to obscure part of the exposed conductors 62, and a 100 nanofarad capacitor 65 is positioned against each conductor 62 so that one electrode 66 thereof is in contact with the conductor and is soldered or otherwise connected to it, while the other electrode 67 rests on the insulating film 64. In the shallower part of the recess a bank 68 of chalcogenide glass switches, one for each live conductor, is located on an adhesive strip 69. The switches are formed by depositing a continuous ten micrometer thick layer 70 of the chalcogenide glass onto a copper lower electrode 71 so that the glass layer extends along the electrode 71 over its entire length except for a region 72 that is positioned over the ground pin conductor 62'. Nine copper/gold spot electrodes 73 are formed on the glass layer 70 and a wire bond 74 is formed between each electrode 73 and electrode 67 of each capacitor 65. In addition, a gold contact 75 is formed on the copper lower electrode 71 which is wire bonded to the exposed portion of the ground conductor 62'.

In normal operation, all the conductors 62 are isolated from one another and from the ground conductor 62' by the high resistance chalcogenide glass layer 70. When any of the lines connected to the conductors 62 experiences a transient, the capacitor 65 will exhibit a low impedance to the transient due to its high frequency, and the switch formed by the chalcogenide glass layer 70 and electrodes 71 and 72 will allow the transient to pass to the ground conductor 62'. In the event that the conductor or conductors that experience the transient carry a direct current with a potential relative to the ground conductor that is higher than that necessary to hold the glass layer 70 in its low resistance state the presence of the capacitor 65 will prevent flow of any current, and the glass 70 will therefore immediately revert to its high resistance state. In the case where the line carries a low frequency alternating current, latching of the glass layer 70 may be prevented by the impedance of the capacitor 65, and/or by the fact that the glass will revert to its high resistance state as the instantaneous current reaches zero during change of phase in a single a.c. cycle.

We claim:

1. A device for protecting an electrical circuit from voltage transient, which comprises (a) a chalcogenide glass semiconductor threshold switching element that is connected, or arranged to be connected, between a current carrying line of the circuit and earth, the switching element having a threshold switching voltage that is higher than the normal operating voltage of the line, so that it will remain in a high resistance state during normal operation and will switch from the high resistance state to a low resistance state when subjected to the transient but will remain in its low resistance state for as long as a holding current is maintained through the switching element; and (b) a capacitor having a capacitance of not more than 2 microfarads connected in series with the threshold switching element; the device having no current-carrying paths in parallel with the capacitor or switching element so that substantially the entire transient passes through the switching element.

2. A device as claimed in claim 1, wherein the capacitor has a capacitance of at least 10 nanofarads.

3. A device as claimed in claim 2, wherein the capacitor has a capacitance of at least of at least 100 nanofarads.

4. A device as claimed in claim 3, wherein the capacitor has a capacitance of not more than 1 microfarad.

5. A device as claimed in claim 4, wherein the capacitor has a capacitance of not more than 0.5 microfarads.

6. A device as claimed in claim 1, wherein the switching element has a turn-on time of not more than 1 nanoseconds.

7. A device as claimed in claim 1, wherein the switching element has a turn-off time of not more than 10 microseconds.

8. A device as claimed in claim 5, wherein the switching element has a turn-off time of not more than 1 microsecond.

9. A device as claimed in claim 1, wherein the switching element has a latching energy of at least 20 mJ.

10. A device as claimed in claim 9, wherein the switching device has a latching energy of at least 40 mJ.

11. A device as claimed in claim 1, wherein the switching element has a critical switching field strength from $10^4$ to $10^5$ $Vcm^{-1}$.

12. A device as claimed in claim 1, wherein the switching element comprises an amorphous composition comprising germanium, selenium and arsenic.

13. A device as claimed in claim 1, wherein the capacitor is located between the threshold switching element and earth.

14. An electrical circuit which includes a current carrying line, the circuit being protected from a voltage transient by means of (a) a chalcogenide glass semiconductor threshold switching element connected between the current carrying line and earth, the switching element having a threshold switching voltage that is higher than the normal operating voltage of the line, so that it will remain in a high resistance state during normal operation and will switch from the high resistance state to a low resistance state when subjected to the transient but will remain in its low resistance state for as long as a holding current is maintained through the switching element; and (b) a capacitor having a capacitance of not more than 2 microfarads connected in series with the threshold switching element; there being no current carrying paths in parallel with the switching element or capacitor so that substantially the entire transient passes through the switching element.

15. A circuit protection arrangement for protecting an electrical circuit that contains a plurality of current carrying lines from a voltage transient, which arrangement comprises a plurality of chalcogenide glass semiconductor threshold switching elements, each such switching element being connected, or arranged to be connected, between an individual current carrying line and earth via a common capacitor that is connected in series between each of the switching elements and earth; each switching element having a threshold switching voltage that is higher than the normal operating voltage of the line, so that it will remain in a high resistance state during normal operation and will switch from the high resistance state to a low resistance state when subjected to the transient but will remain in its low resistance state for as long as a holding current is maintained through that switching element; the arrangement having no current-carrying paths in parallel with the capacitor or with the switching elements so that substantially the entire transient passes through the switching elements.

16. An arrangement as claimed in claim 15, wherein the capacitor has a capacitance of at least 100 nanofarads.

17. An arrangement as claimed in claim 15, wherein the capacitor has a capacitance of not more than 1 microfarad.

18. An arrangement as claimed in claim 15, wherein each switching element comprises an amorphous composition comprising germanium, arsenic and selenium.

* * * * *